(12) United States Patent
Silva et al.

(10) Patent No.: US 11,388,041 B2
(45) Date of Patent: Jul. 12, 2022

(54) SERVICE-BASED LOSS FORWARDING IN COMMUNICATION NETWORKS

(71) Applicant: Xieon Networks S.a.r.l., Senningerberg (LU)

(72) Inventors: Sergio Silva, Almada (PT); Thomas Hiestand, Reichertshausen (DE)

(73) Assignee: XIEON NETWORKS S.a.r.l., Luxembourg (LU)

( * ) Notice: Subject to any disclaimer, the term of this patent is extended or adjusted under 35 U.S.C. 154(b) by 0 days.

(21) Appl. No.: 16/071,755

(22) PCT Filed: Feb. 8, 2017

(86) PCT No.: PCT/EP2017/052693
§ 371 (c)(1),
(2) Date: Jul. 20, 2018

(87) PCT Pub. No.: WO2171/137411
PCT Pub. Date: Aug. 17, 2017

(65) Prior Publication Data
US 2019/0028327 A1    Jan. 24, 2019

(30) Foreign Application Priority Data

Feb. 11, 2016 (EP) .................................. 16155287

(51) Int. Cl.
*H04L 41/0654* (2022.01)
*H04L 43/0811* (2022.01)
(Continued)

(52) U.S. Cl.
CPC .......... *H04L 41/0654* (2013.01); *G06F 16/23* (2019.01); *H04L 43/0811* (2013.01); *H04L 43/10* (2013.01); *H04L 45/02* (2013.01)

(58) Field of Classification Search
CPC ............. H04L 41/0654; H04L 43/0811; H04L 43/10; H04L 45/02; G06F 16/23
See application file for complete search history.

(56) References Cited

U.S. PATENT DOCUMENTS

| | | | |
|---|---|---|---|
| 6,907,551 B2* | 6/2005 | Katagiri ................ | G06F 11/327 714/48 |
| 7,950,017 B1* | 5/2011 | Cain ....................... | G06F 9/546 719/310 |
| 2004/0170128 A1* | 9/2004 | Takamichi ............. | H04L 41/06 370/245 |
| 2006/0031482 A1 | 2/2006 | Mohan et al. | |

(Continued)

FOREIGN PATENT DOCUMENTS

EP    1596531 A2    11/2005

OTHER PUBLICATIONS

Gerstel, O. et al., "Optical layer survivability—an implementation perspective", IEEE Journal on Selected Areas of Communications, IEEE Service Center, vol. 18 (10):1885-1899 (2000).

(Continued)

*Primary Examiner* — Michael Thier
*Assistant Examiner* — Nevena Zecevic Sandhu

(57) ABSTRACT

A network node (3, 4) comprising at least one client interface port (40) and a database (46, 48) storing data allowing to retrieve for a given client interface, a service associated therewith, for a given service, a client interface associated therewith. A Maintenance End Point (MEP) (50, 52) is established on the network node and is associated with an end-to-end service between a client device (10, 12) connected with said client interface port and a remote client device connected to a remote network node (3, 4). Said MEP is configured to exchange connectivity messages with a corresponding MEP (50, 52) established on said remote network node and to detect a client interface fault and a (Continued)

service fault based on connectivity messages received from said corresponding MEP, or based on missing connectivity messages from said corresponding MEP. Said network node is configured to determine which service(s) is (are) related to said client interface and to inform the MEP related to this service about said client interface fault, and is configured to determine which client interface(s) is (are) associated with said service and to carry out a predetermined action associated with said client interface(s).

26 Claims, 13 Drawing Sheets

(51) Int. Cl.
*H04L 43/10* (2022.01)
*G06F 16/23* (2019.01)
*H04L 45/02* (2022.01)

(56) References Cited

U.S. PATENT DOCUMENTS

| | | | |
|---|---|---|---|
| 2007/0204068 A1* | 8/2007 | Oku | H04L 12/66 709/251 |
| 2011/0039526 A1* | 2/2011 | Ait-Ameur | H04L 67/325 455/418 |
| 2013/0201837 A1 | 8/2013 | Berechya et al. | |
| 2015/0049602 A1* | 2/2015 | Gavita | H04W 4/029 370/229 |
| 2015/0271104 A1* | 9/2015 | Chikkamath | H04L 12/4633 370/401 |
| 2016/0099864 A1* | 4/2016 | Akiya | H04L 45/28 370/216 |

OTHER PUBLICATIONS

International Search Report and Written Opinion, PCT/EP2017/052693, dated Apr. 25, 2017, 16 pages.

* cited by examiner

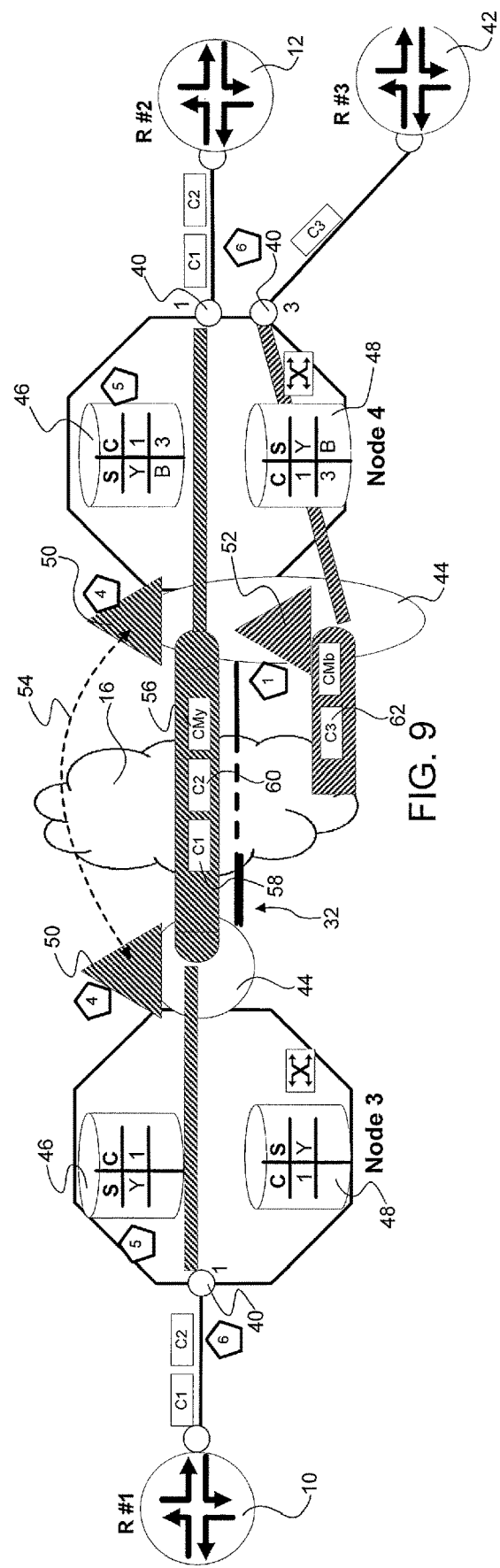

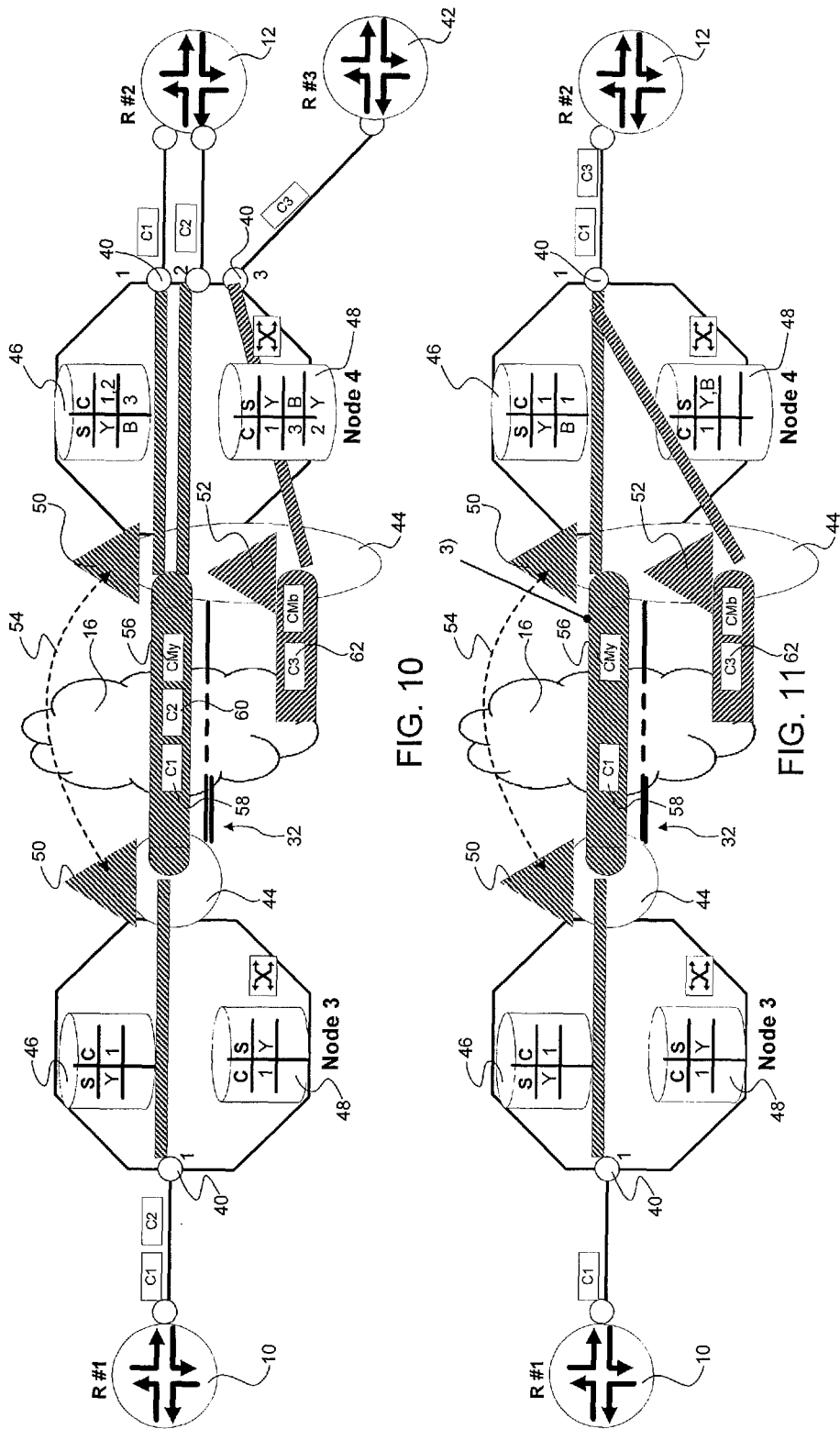

SERVICE-BASED LOSS FORWARDING IN COMMUNICATION NETWORKS

This application is a 35 U.S.C. 371 national stage filing of International Application No. PCT/EP2017/052693, filed on Feb. 8, 2017, which claims priority to European Patent Application No. 16155287.2, filed on Feb. 11, 2016. The entire contents of these applications are incorporated herein by reference in their entirety.

FIELD OF THE INVENTION

The present invention is in the field of network architecture and network control. In particular, the present invention relates to network nodes for implementing a service-based loss forwarding mechanism, a network comprising such network nodes and a corresponding method.

BACKGROUND AND RELATED ART

In a routing environment, packets are forwarded according to a so-called routing table. The routing table contains so-called route entries, which show the best interface to reach the destination address. The entries to the routing table can be configured by an operator. Operator-configured routes are also referred to as "static routes". Alternatively, the routing table entries can be automatically determined by suitable routing protocols. Routes automatically configured by a routing protocol typically referred to as "dynamic routes".

A widely used routing protocol is the Open Shortest Path First (OSPF) protocol. The goal of a routing protocol is to configure the routing tables automatically, so that end-to-end paths in the network are automatically updated in case of network topology changes. In order to obtain a configured routing table, typically the following steps are carried out:
1. Each router communicates with all other routers in the network using Link State Advertisement (LSA) messages to inform about the router's ID, to inform about which other routers the present route is connected to, via which interface and at what cost.
2. Each router collects the LSAs in a link-state database representing the network topology.
3. Using the Shortest Path First (SPF) algorithm, every router calculates a Shortest Path Tree (SPT) topology of the network and consequently the best path to reach the destination. Under the OSPF protocol, the best path is determined by a lowest metric or cost value. The metric value may be based on a link bandwidth. The metric for a route may be the sum of the metrics for all the links in the route
4. The best paths to the destination addresses are used for updating the entries in the routing table, and the best path is stored as a route in the routing table.

FIG. 1 shows a first router 10 and a second router 12. In FIG. 1, the best path as calculated by the routing protocol is the path 14 which extends between the physical ports E0 at the first and second routers 10, 12 and traverses a switching network 16, such as a wide area network (WAN) or any other physically non transparent network. Under operation, hello messages, also referred to as "keep-alive messages" continuously check for reachability of neighboring routers along the path 14. When a failure occurs as indicated by the cross in the upper link shown in FIG. 2, since no direct physical connection exists between the first and second routers 10, 12, this would only be detected within 30 to 40 seconds by missing hello messages. Link-state advertisements (LSAs) are sent to the other routers causing every router to recalculate entries in the corresponding routing tables. When the recalculation of the routing tables has been finished, a new route or path 18 between the first and second routers 10, 12 becomes active, which path extends between the physical ports E1 at the first and second routers 10, 12 and likewise traverses the switching network 16 (or other physically non transparent network). Since the path 18 connects the same routers 10, 12 as the path 14, it may also be referred to as an "redundant path". This redundant path is automatically established under the routing protocol.

However, the convergence time for establishing the redundant path 18 can be quite substantial and may easily be in the range of minutes, as it corresponds to the sum of the following durations:
a) the time for detection of the failure of the active path,
b) the propagation time to inform other routers by LSAs,
c) SPF calculation time on all routers upon receipt of new network information by LSAs, and
d) time for updating the routing tables.

To reduce the long redundant path convergence times encountered in pure OSPF routed networks, the Equal Cost Multipath (ECMP) routing strategy can be used, where next-hop packet forwarding to a single destination can occur over multiple "best paths" which tie for top place in the routing metric calculations. The ECMP routing strategy can be combined with the so called Fast ReRoute (FRR) protection mechanism. In this scenario, simply put, the routers store several routes, such as the best and the second best one, to the same destination in the routing table. If the route gets down, the ECMP uses FRR to redirect the traffic along a backup path without having to first update the routing table. This way, the time durations c) and d) above can be avoided, but the time durations a) and b) remain. In practice, this still leaves convergence times on the order of one minute.

The time durations a) and b) can in principle be avoided by using physical point-to-point connections. In this case, link down failure situations can be detected in a dual digit millisecond range. As a consequence of physical link down detection, the packet forwarding would then use the remaining operational route. For this reason, it is good practice to use direct physical point-to-point links whenever possible. It is however obvious that direct physical point-to point links are not possible in most applications. In practice, there are typically physically non-transparent networks between the routers. So time durations a) and b) remain present as principle disadvantages of fault management using L3 mechanisms even with ECMP and FRR.

One possible way of avoiding or reducing the time durations a) and b) could be based on layer 1 loss forwarding. The idea of this mechanism is to propagate a network error, such as the loss of a physical connection, to all affected interfaces. This way, the error propagates eventually from the network to the customer site. On the customer site or network access side, suitable mechanisms could then be established to react to the network error. This will be further explained with reference to FIG. 3, in which an aggregating network for end-to-end services is shown, i.e. a network which aggregates end-to-end services from different sources and physical connections to one physical connection. In FIG. 3, again a WAN 16 is shown which includes nodes 1 through 4. Each of the nodes 1 through 4 is a network element with ethernet or packet aggregation capabilities for ethernet/packet services. Further in FIG. 3, the open circles resemble physical network interfaces, the thick lines correspond to physical connections within the WAN, and the thin lines resemble physical connections to customer equipment, such as the first and second routers 10 and 12 shown in the FIG. 3. The thick line 20 with the (bottom left to top right) hatched filling represents a logical service referred to as "service yellow" in the following, where the hatching used in thick line 20 (from bottom left to top right) shall resemble the color yellow. Please note that the colors are simply meant to designate different services in the description. The thick line 22 with the oppositely hatched (bottom right to top left) filling represents a logical service referred to as "service blue" in the following, and the hatching used in the thick line 22 shall represent the color blue. Finally, the thick line 24 with the striped filling shall resemble a logical service referred to as "service green" in the following, where the striped filling pattern of the thick line 24 shall represent the color green.

As is seen from FIG. 3, the yellow, blue and green services are all aggregated on the same physical connection (thick black line) between node 2 and node 4. Further, the blue and green services 22, 24 are aggregated on the physical connection between node 1 and node 2, while only the yellow service 20 occupies the physical connection between node 3 and node 2.

With reference to FIG. 4, let it now be assumed that an error occurs in the physical link between node 3 and node 2 as indicated by the solid cross 26. This error could for example be due to an optical connection fiber cut or the like. This fiber cut would lead to a link down at the corresponding ports, e.g. ethernet ports, of node 2 and node 3.

On node 2, a simple loss forwarding mechanism would force all affected interfaces to link down status. This is indicated by the dashed cross 28. The consequently forced loss of signal is then recognized on node 4 to which the customer equipment, in this case the second router 12 is connected, as indicated by the dashed cross 30. Note that the order of events, involving various components in the figure, is indicated by the number encircled with a pentagon placed next to the respective component in the figure. This second router 12 can then react accordingly with fault management, for example by informing an operator or by carrying out protection activities, such as using an alternative path or the like. However, while the network error at the place of the solid cross 26 is inevitably influencing the yellow logical service 20, effectively the blue and green logical services 22 and 24 are likewise affected, although from the network point of view, there is no reason why the blue and green services 22 and 24 should not remain active. Accordingly, the layer 1 loss forwarding described with reference to FIGS. 3 and 4 above has the problem that not impacted services will also be affected, by the fault management, especially in aggregating networks.

SUMMARY OF THE INVENTION

A problem underlying the present invention is to improve the redundancy convergence time of communication via service-based physically non-transparent networks, in particular for point-to-point communication services.

This problem is solved by a network node according to claim 1, a network according to claim 14 and by a method according to claim 18. Preferable embodiments are defined in the dependent claims.

According to one aspect of the invention, a network node is provided, said network node comprising at least one client interface port for connecting the network node with a client device. The client device could e.g. be a router, but could generally be any customer device which can be a source or sink for packet traffic and can decide between alternative paths to reach a remote device, e.g. a carrier ethernet switch, a provider backbone bridge, a packet relay, a frame relay, a MPLS label switch, an ATM switch, a lambda switch. The network node comprises or has associated therewith at least one database storing data allowing to retrieve for a given client interface of said network node, one or more services associated therewith, and for a given service, one or more client interfaces associated therewith.

At least one Maintenance End Point (MEP) is established on the network node, the MEP associated with an end-to-end service between a client device connected with said client interface port of the network node and a remote client device connected to a remote network node, said MEP being configured to exchange connectivity messages with a corresponding MEP established on said remote network node. In the present disclosure, a "Maintenance End Point" is a functionality that can be implemented in hardware and/or software and that comprises at least the aforementioned function of exchanging connectivity messages with a corresponding MEP established on said remote network node. Herein, each of the MEPs hence define a boundary of the service maintenance domain. Note that the service domain can consist of a complete network.

The network node is configured to detect
a client interface fault, which client interface fault corresponds to a situation in which the communication between the network node and said client is inoperative, and
a service fault, based on
the content of connectivity messages received from said corresponding MEP established on said remote network node, or
based on missing connectivity messages from said corresponding MEP established on said remote network node, which service fault corresponds to a situation in which the communication between said at least one remote client device and the present network node employing said service is inoperative. Simply put, the service fault is a fault from the "network side". The service fault could either be due to a fault in the path between the instant network node and the remote network, or due to a client interface fault at the remote node.

The network node is further configured to, upon detecting said client interface fault,
determine from the database which service(s) is (are) related to said client, and
inform the MEP related to this service about said client interface fault.

The network node is further configured to, upon detecting said service fault,
determine from the database which client interface(s) is (are) associated with said service, and
carry out a predetermined action associated with said client interface(s).

Using network nodes of the invention, including the MEP and the database, a mechanism referred to as Service-based Loss Forwarding (SLF) herein can be employed, as will be further explained with reference to specific embodiments below. If a logical service is to be established between two or more clients, two of the network nodes according to the invention can be established at the terminal nodes of the service. Then, if a service fault occurs somewhere along the path between the terminal nodes, or if a client interface fault occurs at a client interface or at the client itself, the occurrence of the error can be communicated to the clients rapidly, typically within less than 20 ms. Accordingly, from the client device point of view, the situation is very similar to that of a physical point-to-point connection, although in reality a service-based physically non-transparent network is used. Moreover, using such network nodes, it becomes possible ensure that network errors for specific services only affect the corresponding interfaces and services, but leave all other interfaces and services unaffected, particularly in aggregating networks.

Preferably, the network node is further configured to, upon detecting that said service fault has been recovered,
   determine from the database which client interface(s) is (are) associated with said service, and
   revert said predetermined action associated with said client interface(s).

This way, once the service fault has been recovered, the network nodes allow to bring the corresponding service back to operation quickly.

In a preferred embodiment, said at least one database includes information indicating
   whether a certain service involving the instant network node is subjected to a service fault, and/or
   whether a client interface associated with said remote network node is subjected to a client interface fault, and/or
   whether a certain client interface associated with the instant network node is subjected to a client interface fault.

As will become apparent from a specific embodiments below, based on this information, the quick and reliable detection of client interface faults or service faults, and the communication thereof to the clients involved, can be ensured.

Preferably, the network node is configured
   to check, upon detecting a client interface fault and determining which service or services is (are) related to said client, whether this service or services is (are) marked as being subjected to a service fault in the database, and if this is not the case, to update the database accordingly, and/or
   to check, upon detecting that a client interface fault has been recovered and determining which service or services is (are) related to said client, whether this service or services is (are) marked as being subjected to a service fault in the database, and if this is the case, to update the database accordingly.

In a preferred embodiment, the network node is configured to carry out one or both of the following steps:
   In case a MEP is informed by received connectivity messages, or by missing connectivity messages, that a service fault has occurred, or a fault with a remote client has occurred, to update the database accordingly, e.g. by providing a mark in the database that the corresponding service is subject to service fault.
   In case a MEP is informed by received connectivity messages, that a service fault has been recovered, or a fault with a remote client has been recovered, to update the database accordingly, e.g. by removing such marking in the database that the corresponding service is subject to service fault.

In a preferred embodiment of the network node, the MEP is configured to send connectivity messages based on the status of the information included in the database as to whether a certain client interface associated with the instant network node is subjected to a client interface fault.

Preferably, the aforementioned predetermined action associated with said client interface is stored in said at least one database.

In a preferred embodiment, said predetermined action associated with said client interface(s) is an action suitable for informing the client(s) of the service fault. Once the clients are informed about the service fault, they can for example switch to an alternative path. Herein, the predetermined action associated with said client interface(s) may comprise one or more of closing down the link between said network node and said client(s), dropping of frames, modifying frames and re-direction of frames. In particular, by using link states for signet ring of network problems to the clients, multivendor interworking is possible with several layer 2 and layer 3 resiliency mechanisms. In fact, very simple link down mechanisms can be used to inform client devices about service faults, which means that very simple routers, or even legacy routers can be used while still achieving fast redundancy convergence.

In a preferred embodiment, wherein a protocol for connectivity fault management is enabled on the network node, in particular an TFEE 802.1ag or an ITU-T Y.1731 protocol. Using such types of established connectivity fault management protocols, essentially the WAN network itself cares for the self s fault management, needing to fast fault detection, rather than the external equipment. This also leads to a very favorable scalability that will be described in more detail below. Simply put, the more logical services are needed, the more "intelligence" is added to the WAN network to handle and to and service where fault management.

In a preferred embodiment, the MEP established on said network node is configured to send connectivity messages to said corresponding MEP at the remote node in regular intervals, to thereby indicate the status of the service.

Preferably, said connectivity messages include further information, in particular information about the status of one or more client interfaces associated with the service.

In a preferred embodiment, said at least one database can be configured by an operator. In particular, the operator can preferably manually manipulate the database information indicating whether a certain service involving the instant network node is subjected to a service fault or not, and/or whether a certain client interface associated with the instant network node is subjected to a client interface fault or not. In addition or alternatively, the operator can manually manipulate the database information with regard to which service(s) is (are) associated to which client interface(s), and which client interface(s) is (are) associated to which service(s). Moreover, the operator can manually set the predetermined action associated with said client interface(s).

BRIEF DESCRIPTION OF THE FIGURES

FIG. 9 shows the same WAN as FIG. 5, but with the network service error of FIG. 8 cleared, FIG. 10 shows a similar WAN as FIG. 5, but with a service multiplexing topology in which several client interfaces subscribe to one service, FIG. 11 shows a similar WAN as FIG. 5, but with a service multiplexing topology in which traffic of one client interface is multiplexed to several services.

DESCRIPTION OF THE PREFERRED EMBODIMENTS

Figure 1:
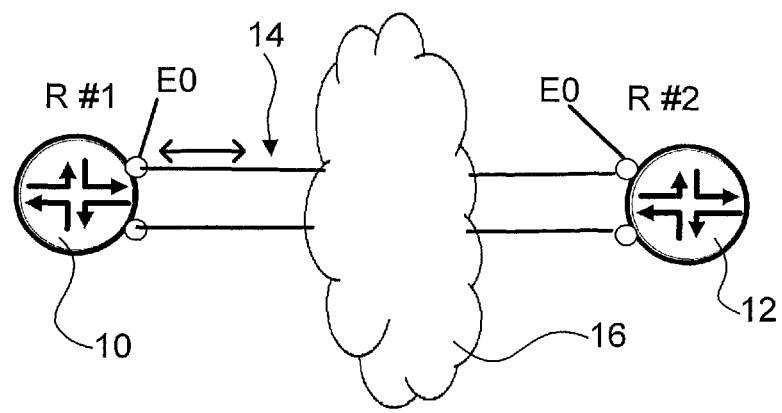
FIG. 1 shows first and second routers connected by a path and a redundant path traversing a switching network.
Figure 2:
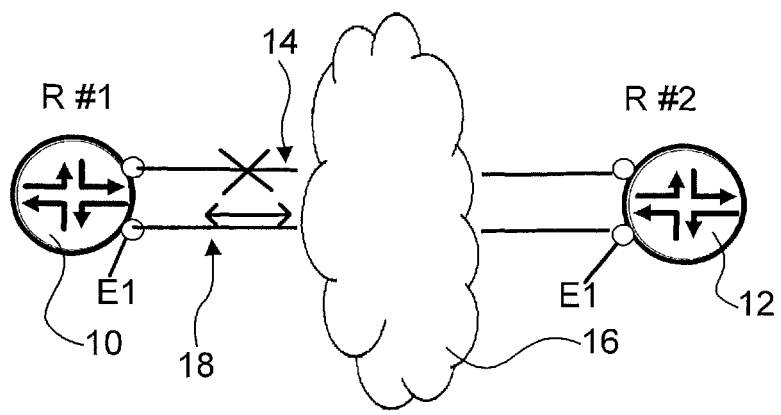
FIG. 2 shows the same situation as FIG. 1, but with a failure occurring in the path.

Next, the service-based loss forwarding (SLF) mechanism according to various embodiments of the invention will be described with reference to FIG. 5 to FIG. 9. In FIG. 5, again two client devices, e.g. routers 10 and 12 are shown. Between the two routers 10 and 12, a logical service "yellow" is established, which is again indicated by the hatching from bottom left to top right. For the logical service "yellow", two paths are provided: The first path 32 extends between node 3 and node 4 through the WAN 16. The second path 34 extends between nodes 36 and 38 through the WAN 16. Note that the nodes 36 and 38 are generally of the same type as nodes 3 and 4, but are shown in less detail and will not be separately described. Nodes 3 and 4 are hence the termination nodes of path 32, and nodes 36 and 38 are the termination nodes of path 34.

Figure 5:
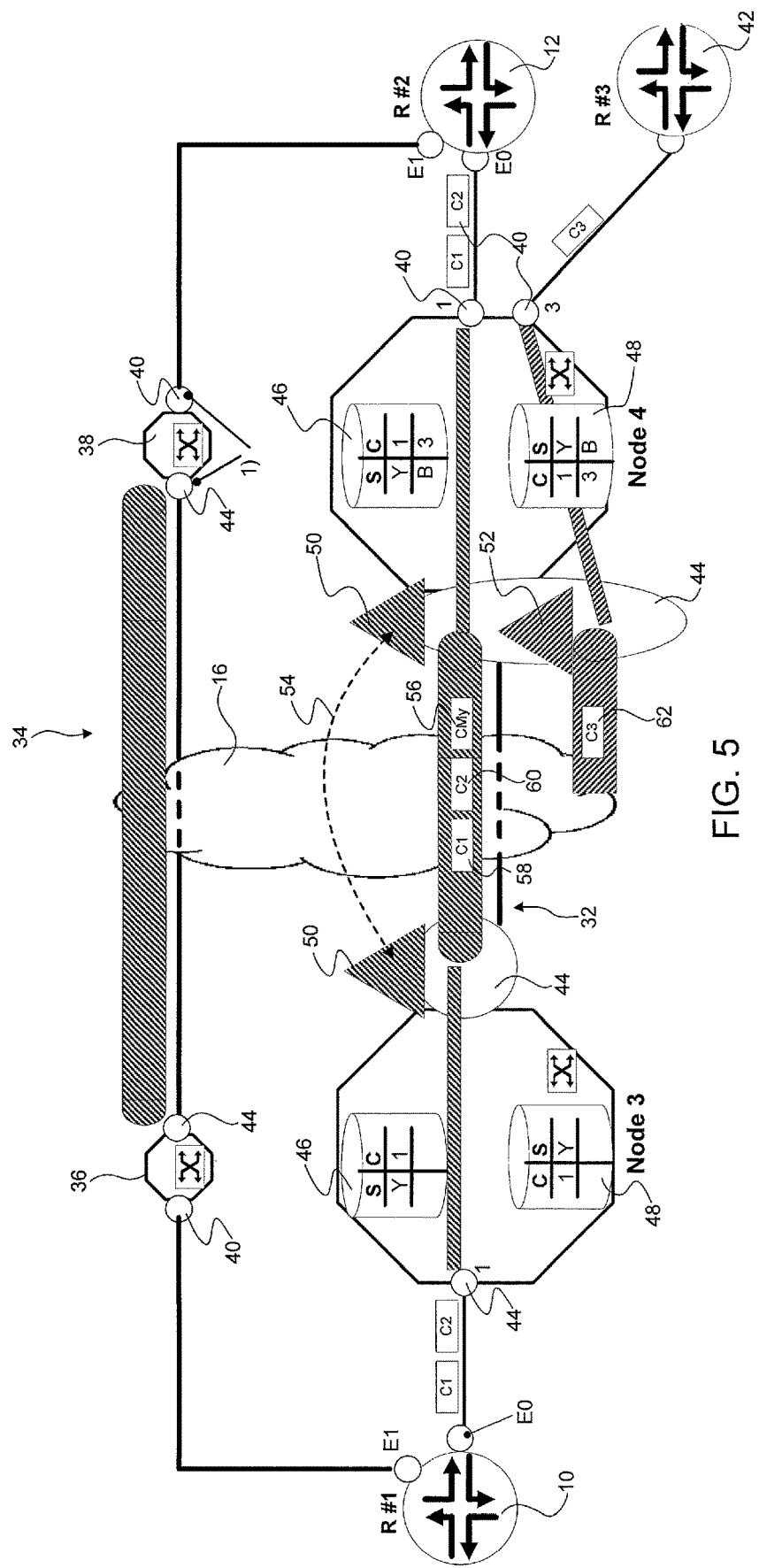
FIG. 5 shows a WAN and two pairs of terminal nodes of an end-to-end service established thereon.

Each of nodes 3, 4, 36 and 38 has a client interface 40 indicated by a circle. The number next to the client interface 40 of node 3 and node 4 indicates an associated client, which in case of FIG. 5 is "client 1" for both nodes. As is further seen in FIG. 5, node 4 has an additional client interface 40 designated with a number "3", indicating that this client interface 40 serves a "client 3", which corresponds to a third router designated by reference sign 42. In the following, for simplicity reference will often be made to a "client interface x" rather than to a "client interface 40 serving client x", for brevity. Client 3 takes part in a different logical end-to-end service, indicated by a hatching from bottom right to top left and referred to as "blue service" in the following. Note that in FIG. 5, traffic for customers 1 and 2 associated with the same client interface 1 is shown as "C1" and "C2" under reference signs 58, 60, respectively. More particularly, the traffic may employ traffic frames having a frame ID (e.g. Customer VLAN tag or the like) to indicate which traffic belongs to which customer. This is also referred to as logical traffic separation in the art.

As is further seen in FIG. 5, each of nodes 3, 4, 36 and 38 has at least one physical network interface 44, which is likewise represented by a circle or, in case of node 4, by an ellipse.

On each of the terminal network nodes for a given service, a first database 46 is established, which allows to retrieve, for a given service, one or more client interfaces associated therewith. This first database 46 is also referred to as "SLF Service to Client IF Fault DB" herein, where "IF" stands for interface and "DB" stands for database. For example, in the first database 46 on node 3, for a given service "yellow" (Y), the corresponding client interface 1 can be retrieved. Since node 3 is not a terminal node to any other service, no further services are recorded in the first database 46 on node 3. While in the example of FIG. 5 only one client interface is associated with the service yellow, it is generally possible that plural client interfaces are associated with a same service, to thereby support service-multiplexing in the sense that one service serves plural clients.

Similarly, in the first database 46 on node 4, for a given service "yellow" (Y), the corresponding client interface 1 can be retrieved. However, since node 4 is also a terminal node for the service "blue", the first database 46 on node 4 also contains a field for the blue service (B), and the corresponding client interface 3 can be retrieved for the blue service.

In preferred embodiments, the first database 46 further stores information on actions to be taken on the associated client(s) and/or client interface(s) in case of a service fault. Exemplary actions to be taken on a client interface upon service failure could be as follows:

Forcing a link down.

Dropping frames, i.e. keeping the link to the client(s) on the link level working, but canceling specific traffic frames. The specific traffic frames to be canceled could be selected for example according to end-to-end service labels, priority attributes, address attributes or the like.

Redirecting frames, in the sense that the frames are not sent to the normal client interface or normal client device, but to another client interface or client device.

Further, although not shown in FIG. 5, each service database entry in the first database 46 has information fields indicating whether a "service fault condition" or a "remote client fault condition" is active or not.

On each of the terminal network nodes for a given service, a second database 48 is further established, which allows to retrieve, for a given client, one or more services associated therewith. This second database 48 is also referred to herein as "SLF Client IF to Service Fault DB". For example, the second database 48 on node 3 allows to retrieve service yellow for client 1, and the second database 48 on node 4 allows to retrieve service yellow for client 1 and service blue for client 3. Although this is not shown in the embodiment of FIG. 5, it is possible that more than one service is associated with a single client interface, thereby supporting service-multiplexing in the sense that one client interface is served by several services. As mentioned above with respect to the first database 46, it is likewise possible that in the second database 48, different client interfaces refer to the same service. In other words, each client interface database entry can reference to one or several services, thereby supporting service multiplexing. As will be explained in more detail below, traffic of different customers on the same client interface can be multiplexed to different services (see FIG. 11 below).

In preferred embodiments, the second database 48 further stores information on actions to be taken in case of a client interface fault. In particular, in case of a client interface fault, a local Maintenance End Point (MEP) (to be described in more detail below) associated with the service that is referenced by the client interface that is subject to a fault will inform its partner MEP at the remote node about the local fault. Herein, if node 3 is the "local" node, then node 4 is the "remote" node, and vice versa. In preferred embodiments the action of informing local MEP about a client interface fault is a pre-defined and obligatory action.

Further, although not shown FIG. 5, each client database entry in the second database 48 has information fields indicating if a "client interface fault" is active, i.e. whether a local client interface fault is present, or not.

While the first and second databases 46 and 48 are described as two separate databases for illustration purposes, they could of course be part of a same database. Similar first and second databases 46 and 48 are provided on nodes 36 and 38, but are not described in any detail herein.

Note further that in the present disclosure, the term "database" has a broad meaning and shall cover any type of memory and associated data structure allowing to determine one or more clients associated with a given service and/or one or more services associated with a given client.

Moreover, on each of the terminal network nodes for a given service, a corresponding Maintenance End Point (MEP) is established. The MEP is symbolized by a triangle with a hatching or "color" associated with the corresponding service. In particular, one MEP 50 associated with the yellow service is established on each of nodes 3 and 4 of FIG. 5. Further, a MEP 52 associated with the blue service is established on node 4. A MEP is a function established on the respective terminal node of the service, which may have one or more of the functionalities that are described below.

One function of the MEP is to exchange connectivity messages with its "partner-MEP", i.e. with the MEP established on the other terminal node of the corresponding service. The exchange of connectivity messages is symbolized by the dashed arrow 54 in FIG. 5. These connectivity messages could be connectivity messages under a standard protocol for connectivity fault management, for example an IEEE802.1ag protocol or an ITU-T Y.1731 protocol, which connectivity fault management is established per service. In FIG. 5, a connectivity message for the yellow service "CMy" is shown under reference sign 56. Further, traffic "C1" and "C2" related to different customers 1 and 2, respectively, is exchanged between routers 10 and 12 and is shown by reference signs 58 and 60, respectively. Moreover, traffic "C3" related to a customer 3 associated with router 42 is shown under reference sign 62. Note that different "customers" may, but need not be associated with different clients.

Actions and Functionalities of SLF

Under the Service based Loss Forwarding (SLF) a mechanism according to an embodiment of the invention, the following actions and functionalities are provided:
a) Service Fault to First Database Action
  In case an MEP 50 is informed by the received connectivity messages (or missing connectivity messages) that a service fault has occurred, or a fault with a remote client has occurred, it causes the "service fault condition" field or the "remote client fault condition" field of the first database 46, respectively, to be set active.
  In case an MEP 50 is informed by the received connectivity messages that a service fault has been recovered, or a fault with a remote client has been recovered, it causes the "service fault condition" field or the "remote client fault condition" field of the first database 46, respectively, to be set inactive.
b) Operator Driven Manual First Database Action
  The SLF mechanism allows for operator driven manual actions, such as input of commands or the like, to influence the "service fault condition" field or the "remote client fault condition" field of the first database 46, respectively. This can in particular be used for manually forced protection switch over.
  The SLF mechanism further allows an operator to lock individual entries of the first database 46.
c) First Database to Client Interface Action
  Based on the entries having active service fault condition fields in the first database 46 entries, the SLF mechanism is configured to execute consequent action for the corresponding client interfaces.
  In order to avoid network fluctuations, the consequent actions will only be carried out with some delay, or, in other words, after a predetermined hold-off time determined by a hold-off counter has passed. It is however possible to configure the delay time to zero in some embodiments.
  If service entries in the first database 46 have inactive service fault condition fields, the SLF mechanism will reverse the consequent action for the corresponding client interfaces.
  In order to avoid network fluctuations, the consequent actions will only be reverted with some delay, or, in other words, after a predetermined wait-to-restore time determined by a wait-to-restore counter has passed.
d) Client Interface to Second Database Action
  In case a client interface gets to a fault condition, such as to a link down condition, several database actions may be triggered. First, it is determined from the second database 48 which service is related to the client interface. Next, it is checked in the first database 46, whether the corresponding "service fault condition" field is active. If this is the case, no further database action is executed. However, if no "service fault condition" is active, an action in the second database 48 is triggered, according to which the "client interface fault condition" field is set active.
  In case a client interface fault recovers, the corresponding "client interface fault condition" field in the second database 48 is set inactive.
e) Operator Driven Manual Second Database Action
  The SLF mechanism allows for operator driven manual actions, such as input of commands or the like, to influence the "client interface fault condition" field of the second database 48. This can in particular be used for manually forced protection switch over.
  The SLF mechanism further allows an operator to lock individual entries of the second database 48.
f) Second Database to Logical Service Action
  If a "client interface fault condition" field of the second database 48 is active, under the SLF mechanism, this will cause the MEPs to change their connectivity messages accordingly in a way depending on the underlying connectivity fault management protocol. For example, the MEP could simply stop sending connectivity messages, or have a client interface fault field within a connectivity message be active. Conversely, if the "client interface fault condition" field of the second database 48 is inactive, the MEP could restart sending connectivity messages, or have a client interface fault field within the connectivity message be inactive.

Next, the function of the SLF mechanism will be further explained with reference to several characteristic operation conditions. It is worth mentioning, that SLF also supports point-to-multipoint and multipoint-to-multipoint services topologies.

A SLF Mechanism for Client Interface Error Raising

Figure 6:
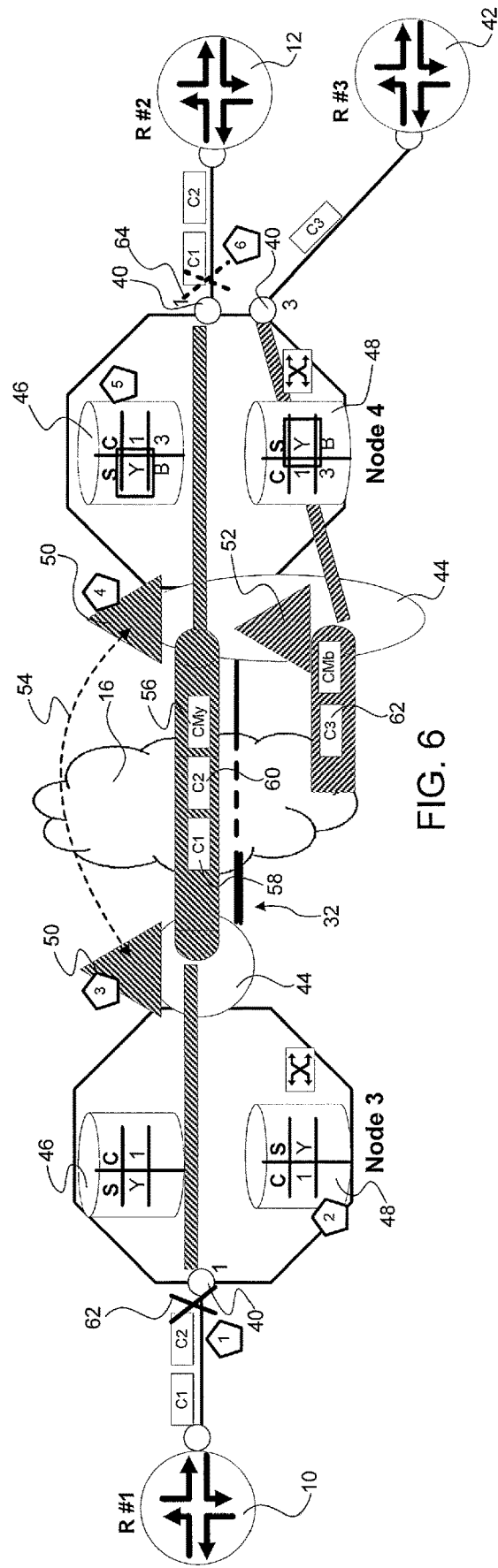
FIG. 6 shows the same WAN as FIG. 5, but with a client interface error occurring.

With reference to FIG. 6, the SLF mechanism for an error raised on a client interface will be explained. Let it be assumed that an error related to the client interface 40 of node 3 occurs. Note that, as before, the reference numeral 40 designates the component as such, while the number "1" designates the client interface to distinguish the same from other client interfaces, such as client interface 3 of node 4. In the following, reference will for all simplicity be made to the client interface by this distinguishing number (i.e. "client interface 1", "client interface 3"), while the component reference number 40 will be omitted. In addition, more than one customer in the example of FIG. 6, two customers 1 and 2 can be served via the same client interface 1. In this case, the SLF mechanism according to an embodiment of the invention carries out the following sequence of steps:

1. A link down on the client interface 1 of node 3 is detected. In FIG. 6, this fault is symbolized by a solid cross 62. The numbers in the pentagons next to a component indicate the temporal sequence in which the described actions are taken. Accordingly, since in this case the sequence starts with the client interface fault, this is indicated by the pentagon with the 1 inside next to the client interface 1 of node 3 and the solid cross 62.
2. The link down condition triggers the SLF mechanism to carry out the following steps:
   checking in the second database 48 which service or services is (are) related to this client interface 1 (in this example, service yellow is affected),
   checking in the first database 46 whether service yellow is already marked for service fault induced from the network side, which would indicate that the link down of the client interface 1 is actually a consequent action of the SLF mechanism in response to such service fault (to avoid a deadlock situation), and
   if the link down is not induced by a service fault, the MEP 50 of node 3 is informed about the client interface fault.
   Note that this step makes use of part of the "client interface to second database action" recited under d) above.
3. The MEP 50 of the yellow service on node 3 informs the remote partner MEP of the yellow service, i.e. the MEP 50 on node 4, about the client interface fault. The precise mechanism how the partner MEP 50 is informed will depend on what fault management protocol is used. Some protocols allow for transporting proprietary information inside the connectivity messages 56. In this case, a client interface status (fault active or interactive) may be transported inside the connectivity message 56.
   An alternative way to inform the partner MEP 50 of the interface status is by simply disabling the sending of connectivity messages 56 in regular intervals, or setting a remote defect indication field in the connectivity message 56 to active. Any other way of informing the partner MEP 50 on the interface status is possible as well.
   Note that this step makes use of part of the "second database to logical service action" recited under f) above.
4. The yellow MEP 50 on node 4 receives the fault information from node 3 depending on the used fault management protocol in one of the ways described under 3. above.
5. The MEP fault condition on node 4 for the yellow service triggers the SLF mechanism to carry out the following steps:
   Determining from the first database of 46 on node 4 which client interface or interfaces is (are) related to the yellow service. In this example, client interface 1 (for customers 1 and 2) is affected.

The service fault is marked in both, the first and second databases 46 and 48 of node 4, as is symbolically indicated by the rectangle in the databases of FIG. 6. In other words, the respective "service fault condition" fields are set to active. In this case, the service fault is actually due to a remote client fault (from the perspective of node 4). Assuming that this information is conveyed by the connectivity message 56, then in this step a "remote client fault condition" field in the first database 46 can be set active.
   For services marked with the active "service fault condition", consequent action will be processed on the affected client interface(s). In this case, the client interface 1 (for customer 1 and 2) of node 4 will be forced to link down, as is indicated by the hatched cross 64. As is apparent from this example, a single client interface ("client interface 1") can serve plural customers (customers "1" and "2").
   Note that this step makes use of the "service fault to first database action" recited under a) and of the "first database to client interface action" recited under c) above.
6. The link down condition of client interface 1 of node 4 triggers the SLF mechanism to check on node 4 in the second database 48 whether the service yellow is already marked for service fault induced from the network side. Since this is here the case, no further actions will be taken.
   Note that this step makes use of part of the "client interface to second database action" recited under d) above.

The described SLF error raise mechanism is combined with a hold-off counter for step 5.). Namely, in order to avoid network fluctuations, a hold-of time has to be passed before the client interface 40 is forced to link down.

B SLF Mechanism for Client Interface Error Clearing

Figure 7:
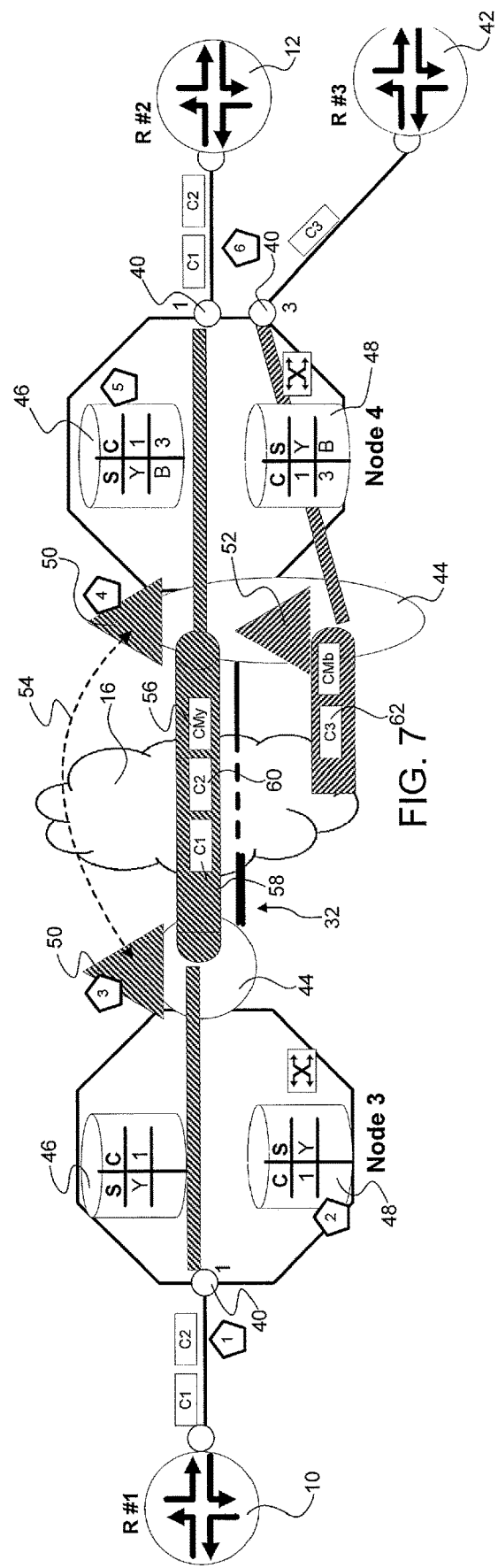
FIG. 7 shows the same WAN as FIG. 5, but with the client interface error of FIG. 6 cleared.

With reference to FIG. 7, the SLF mechanism for an error cleared on a client interface will be explained. Let it be assumed that the error related to the client interface 1 of node 3 shown in FIG. 6 is recovered, i.e. the solid cross 62 shown in FIG. 6 is removed in FIG. 7. In this case, the SLF mechanism according to an embodiment of the invention carries out the following sequence of steps:

1. Error on client interface 1 on node 3 is removed (solid cross 62 shown in FIG. 6 is removed).
2. The change in link status triggers the SLF mechanism to check in the second database 48 on node 3 which service(s) is (are) related to this client interface. In the example shown, the yellow service is affected. The MEP 50 related to service yellow is informed about the link status change for client interface 1.
   Note that this step makes use of part of the "client interface to second database action" recited under d) above.
3. The MEP 50 related to service yellow on node 3 will inform the remote partner MEP 50 of the yellow service on node 4 that the client interface state has changed to no fault condition. As before, the mechanism how to inform the partner MEP 50 is depending on the fault management protocol used.
   Note that this step makes use of part of the "second database to logical service action" recited under f) above.
4. The MEP 50 related to service yellow on node 4 receives the information that the client interface state has changed to no fault condition.
5. The information received in step 4. triggers the SLF mechanism to check in the first database 46 on node 4 which client interface(s) is (are) related to the yellow service. In this example, client interface 1 is affected. Per entry in the first database 46, a consequent action is determined. According to the defined consequent action and the no fault condition, the previous action will be reversed on the affected client interface. In this specific case, the client interface 1 will be enabled (link up) again. The marking of the fault of the yellow service in the first and second databases 46 and 48 on node 4 will be removed, or in other words, the respective "service fault condition" fields are set to inactive. In FIG. 7, this is indicated by the fact that the rectangles shown in databases 46 and 48 in FIG. 6 for the yellow service are now removed.

Note that this step makes use of the "service fault to first database action" recited under a) and of the "first database to client interface action" recited under c) above.

6. The client interface 1 is link-up again, which is indicated by the fact that the hatched cross 64 shown in FIG. 6 is now removed. No further database action will be triggered.

The SLF error clearing mechanism is combined with a wait-to-restore counter for step 5. Namely, in order to avoid network fluctuations, a wait-to-restore time has to be passed before the action is reversed and the client interface 40 is linked up again. Nevertheless, in some embodiments the wait-to-restore time can be configured to 0 seconds delay.

C SLF Mechanism for Network Service Error Raising

Figure 8:
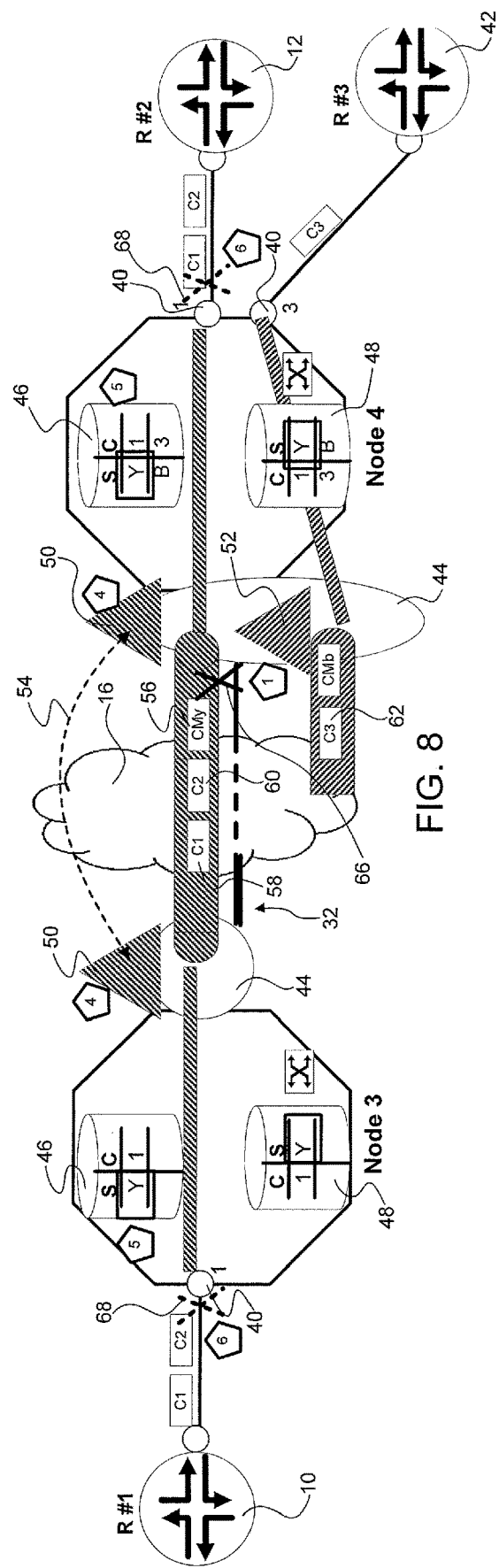
FIG. 8 shows the same WAN as FIG. 5, but with a network service error occurring.

With reference to FIG. 8, the SLF mechanism for an error raised on the network service will be explained. Let it be assumed that a service error occurs somewhere in the network 16 between node 3 and node 4 for the yellow logical service. This could be a physical interface error, such as an optical or electrical error, or any error on the yellow logical service, for example due to a wrong service configuration. In this case, the SLF mechanism according to an embodiment of the invention carries out the following sequence of steps:

1. The service error appears somewhere in the network between node 3 and node 4, as indicated by the solid cross 66 in FIG. 8.

Steps 2. and 3. as described with regard to the SLF mechanism for client interface error raising in Section A above do not apply in this case. Accordingly, in FIG. 8, no pentagons including the numbers 2 and 3 are shown.

Steps 4. to 6. are generally the same as steps 4. to 6. explained above with reference to the SLF mechanism for client interface error raising of section A and need not be recited again. However, contrary to section A, node 3 likewise executes steps 4. to 6.

D SLF Mechanism for Network Service Error Clearing

With reference to FIG. 9, the SLF mechanism for an error cleared in the network service will be explained. Let it be assumed that the network error indicated by solid cross 66 in FIG. 8 has been recovered, i.e. the solid cross 66 shown in FIG. 8 is removed in FIG. 9. In this case, the SLF mechanism according to an embodiment of the invention carries out the following sequence of steps:

1. The service error that had appeared in the network between node 3 and node 4 and was indicated by the solid cross 66 in FIG. 8 has been recovered (no solid cross 66 in FIG. 9).

Steps 2. and 3. as described with regard to the SLF mechanism for client interface error clearing in section B above do not apply in this case. Accordingly, in FIG. 8, no pentagons including the numbers 2 and 3 are shown.

Steps 4. to 6. are generally the same as steps 4. to 6. explained above with reference to the SLF mechanism for client interface error clearing of section B and need not be recited again. However, contrary to section B, node 3 likewise executes steps 4. to 6.

E SLF Support for Service Multiplexing

The SLF mechanism supports a service multiplexing topology in which several client interfaces subscribe to one service, as is shown in FIG. 10. As seen in FIG. 10, traffic C1 of client 1 and traffic C2 of client 2 is mapped to the same yellow service. More particularly, client traffic C1 and C2 are multiplexed to respective client interfaces 1 and 2.

In order to support this topology, the first and second databases 46, 48 can have several client interface references per service database entry, as seen in the databases 46, 48 of node 4 in FIG. 10. With reference to FIG. 10, if the yellow service is in a fault condition, all client interfaces aligned with this entry in the first place 46 will see the consequent action. In this example, the database entry "Y" is aligned with client interfaces 1 and 2. Accordingly, in case of a fault of service yellow, both client interfaces will be set to link down. However, it is the operator's decision whether this is a reasonable decision. Depending on the network topology, it may be desirable to have one of the client interfaces still running, for example if traffic to the client interface comes from different sources of which only one might be affected. This situation may in fact frequently arise in multipoint to multipoint topologies.

In the second database 48, several client interfaces referencing to the same logical service. In the example, client interfaces 1 and 2 have separate entries in the second database 48, referencing to the same logical service yellow. If one of client interface 1 or 2 is link down, the yellow MEP 50 is informed of a fault condition. It is again the network operator's decision whether this is reasonable for the application.

The SLF mechanism further supports a service multiplexing topology in which traffic of one client interface is multiplexed to several services, as is shown in FIG. 11. In FIG. 11, traffic entering node 4 through client interface 1 is multiplexed to the yellow service (traffic C1) and the blue service (traffic C3). In addition, all traffic received at node 4 via the blue or yellow service is mapped to client interface 1.

In order to support this topology, the first and second databases 46, 48 can have several service references per client interface database entry, as is seen in the databases 46, 48 of node 4 in FIG. 11. If the yellow or the blue service is in a fault condition, all client interfaces aligned with these services in the first database 46 will see the consequent action. In the example shown in FIG. 11, the service entries yellow (Y) and blue (B) are both aligned with client interface 1, so client interface 1 will see a link down if there is a fault in one of the blue or yellow services. It is again the network operator's decision whether this is reasonable for the application. Depending on the network topology, it could e.g. be the case that only one service is affected, in which a further distinction could be made.

In the second database 48 of node 4, one client interface references to different logical services. In the example shown in FIG. 11, the entry of client interface 1 in the second database 48 references to both, the blue and the yellow logical service. Accordingly, if the client interface 1 is link down, both the yellow MEP 50 and the blue MEP 52 on node 4 are informed of a fault condition. It is the network operator's decision whether this is reasonable for the application.

F SLF in the Network Context

Figure 3:
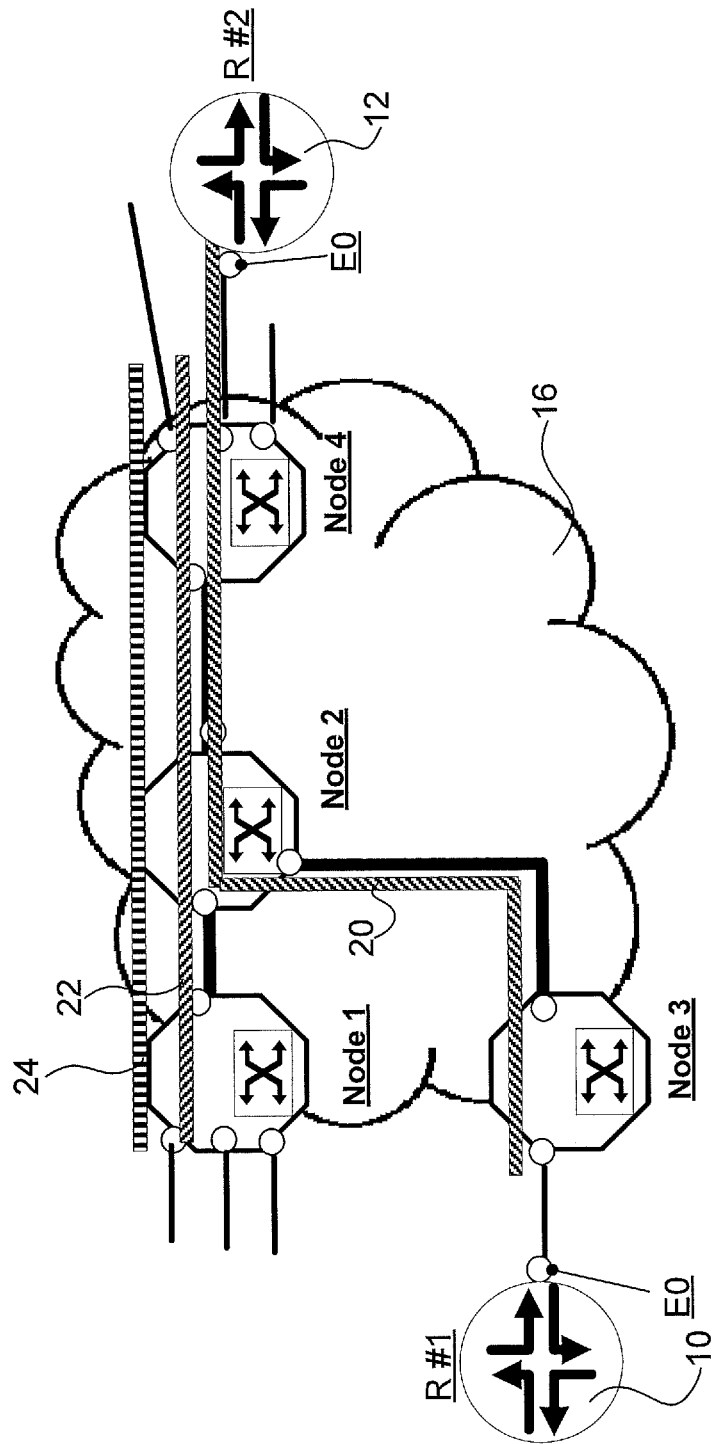
FIG. 3 shows a WAN including four network nodes and having three logical services established thereon.
Figure 12:
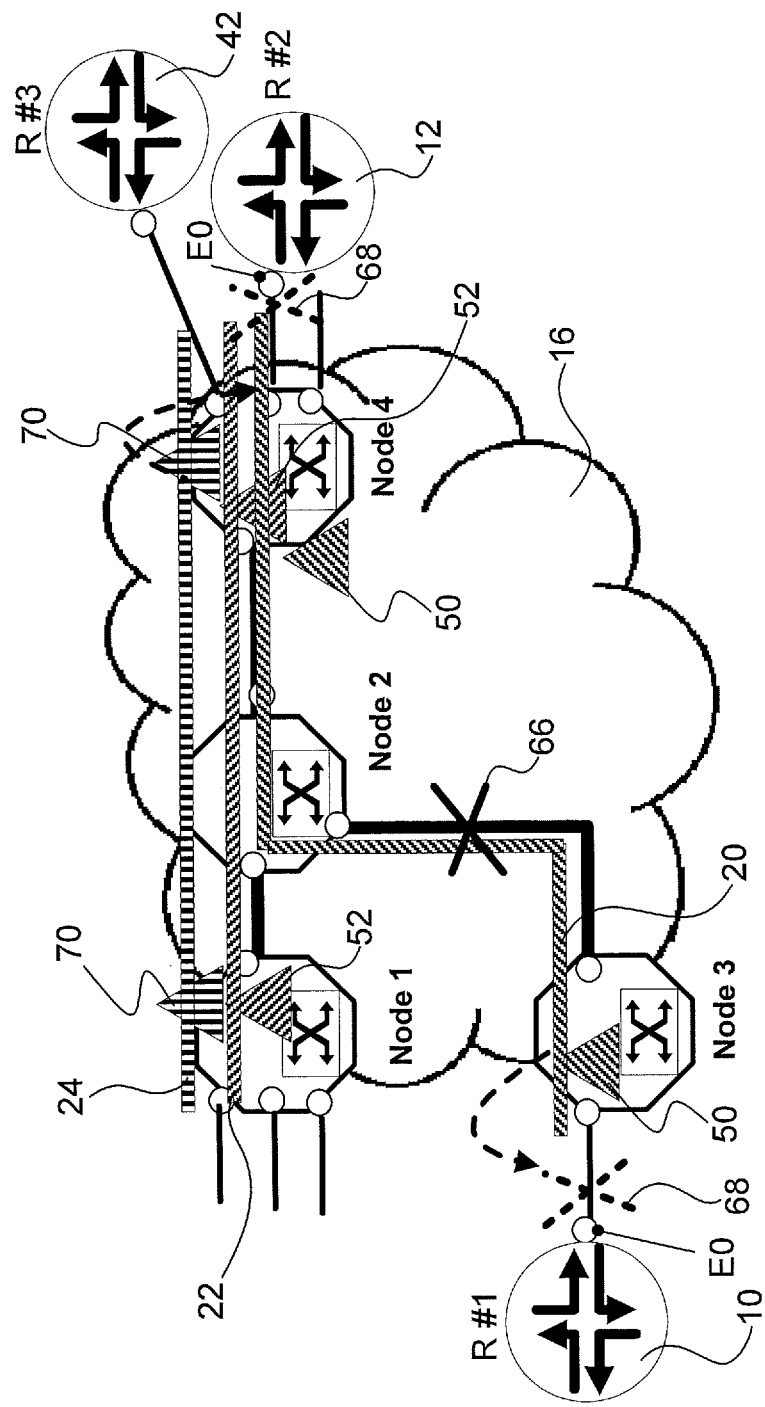
FIG. 12 shows a WAN generally identical to that of FIG. 3, but with an SLF mechanism established thereon, and with a network service error occurring.
Figure 13:
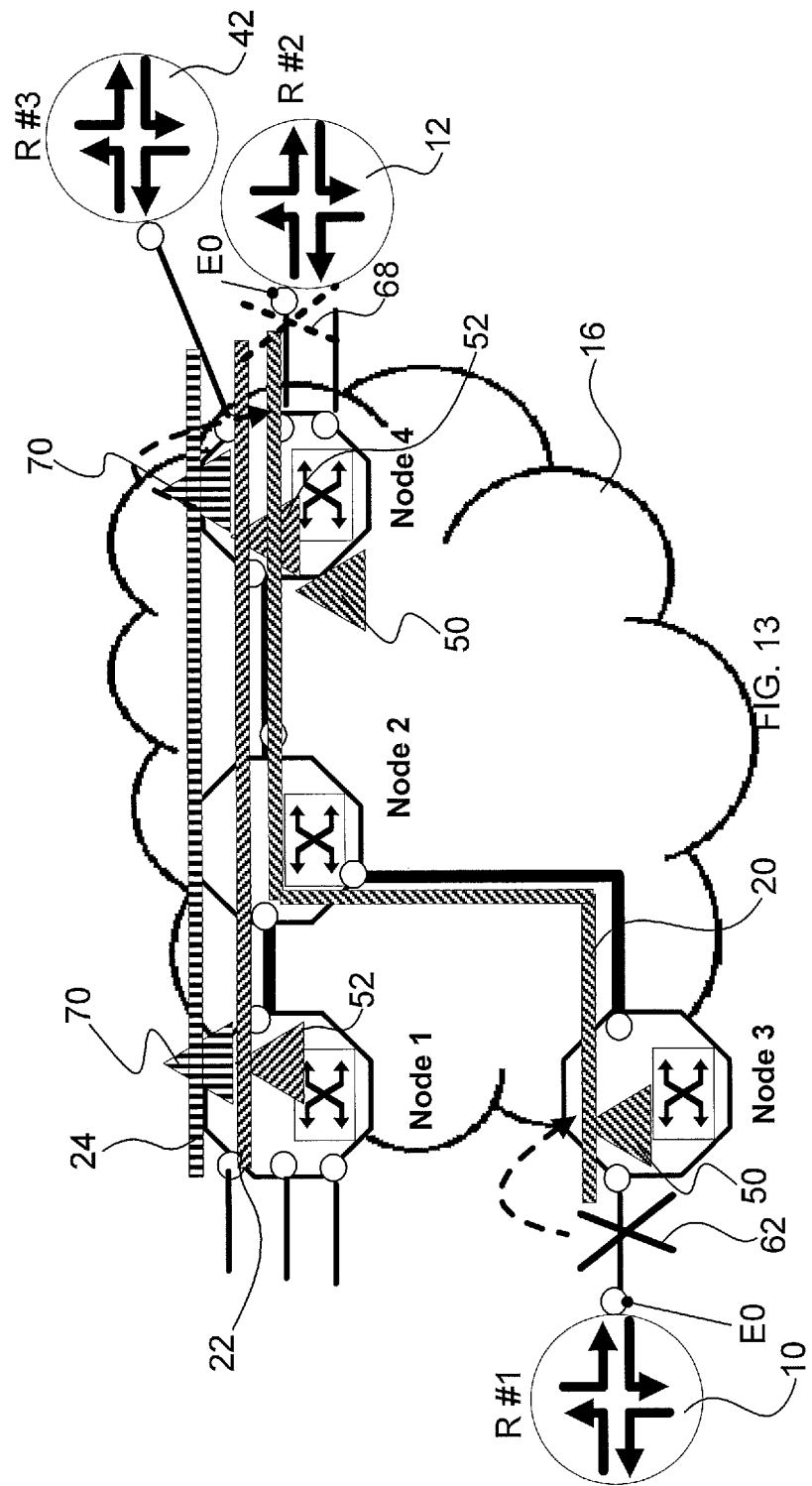
FIG. 13 shows the same WAN as FIG. 12, but with a client interface error occurring.

Next, the operation of the SLF from the network application point of view will be described with reference to FIGS. 12 and 13. Note that FIGS. 12 and 13 show the same network 16, the same nodes 1 to 4 and the same services 20, 22 and 24 as in FIGS. 3 and 4 above, but in a situation, where the SLF is employed. Nodes 3 and 4 are the terminal nodes of the yellow end-to-end service 20. Consequently, MEPs 50 for the yellow service are established on nodes 3 and 4. Moreover, nodes 1 and 4 are the terminal nodes of the blue and green end-to-end services 22, 24. Consequently, MEPs 52 and 70 for the blue and green services, respectively, are established on nodes 1 and 4.

On the termination nodes of the various end-to-end services, i.e. nodes 1, 3, and 4, a commonly used protocol for connectivity fault management is established. Moreover, the yellow, blue and green end-to-end services are monitored by the yellow, green and blue MEPs 50, 70 and 52 as described before. However, the WAN 6 itself cares for the service fault management as such.

The routers 10, 12 and 42 are connected to nodes 3 and 4 and are able to recognize link down conditions and can be triggered in this way to notify service faults as described above and/or to switch to another disjoint pre-provisioned service.

Figure 4:
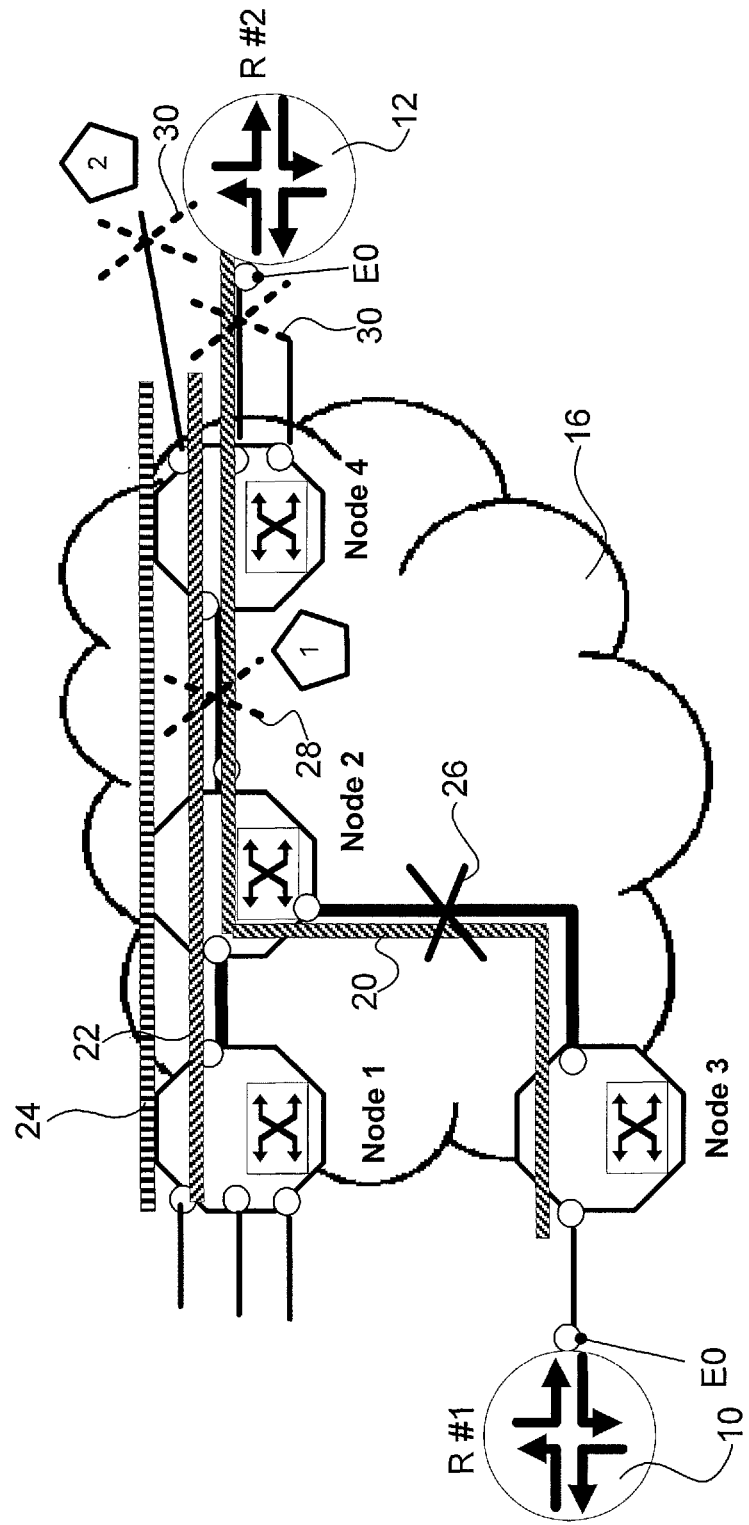
FIG. 4 shows the same WAN as FIG. 3, but with a network error occurring.

Let it be assumed that similar to the situation previously shown in FIG. 4, an error occurs in the WAN network 16 at the place designated by the solid cross 66 in FIG. 12. For example, the error could be a physical connection cut off, such as an optical fiber cut, which will lead to a link down at the corresponding port. Since this error affects the yellow service, the fault management mechanism reveals the problem, in combination with the yellow MEPs 50, which is then reflected in the first and second databases 46, 48 (not shown in FIGS. 12 and 13) in a manner described in section C (SLF mechanism for network service error raising) above. The result of this is that only the client interfaces associated with the yellow service on node 3 and node 4 will be linked down, as shown by the hatched crosses 68 in FIG. 12, while the client interfaces of node 4 associated with the blue and green services 22, 24 will remain linked up. Accordingly, unlike the situation described with reference to FIGS. 3 and 4 above, the blue and green services 22, 24 will remain unaffected by the network error.

The link down on the client interfaces (hatched crosses 68) associated with the yellow service will be recognized by the routers 10 and 12, or by whatever customer equipment is present in general. This triggers the routers 10, 12 (or the customer equipment in general) to notify an operator and/or switch to an alternative path. Importantly, since the link's status is used for signaling the network problem to the equipment outside the WAN network, multivendor interworking is possible with several layer 3 and layer 2 resiliency mechanisms. Thanks to the SLF mechanism disclosed herein, this fault detection and propagation to the routers 10, 12 can be very fast, and in fact may take place on the order of 20 ms only. From the router's point of view, this is similar to a situation encountered when a direct physical connection was present, in spite of the fact that a non-transparent switching network is in reality employed.

In FIG. 13, the same network is shown as in FIG. 12, but it is assumed that the cause of the end-to-end service error is on the client's side, as indicated by the solid cross 62 in the physical link between the first router 10 and node 3. The situation corresponds to the situation shown in FIG. 6 and described in section A (SLF mechanism for client interface error rising), and steps 1. to 6. as described therein are carried out. The result of these steps is that also the client interface employed by the yellow service at the remote node, i.e. node 4, will be linked down. But again, the traffic traveling via the blue and green services to the third router 42 will be unaffected.

With reference to FIGS. 12 and 13, note that irrespectively of where the error occurs, using the SLF mechanism, the client interfaces associated with the affected service will be linked down, and this change of link state is used as a means for signaling the network problem to the external equipment. Importantly, this change of link state at the client interfaces associated with the affected service will be effected very quickly after the error occurs, typically within 20 ms at least when the MEPs are implemented in hardware. From a functional point of view, this is similar to a situation in which the external equipment would be connected by a physical path, or "physical point-to-point connection", where failures in the path would be noticed practically instantaneously.

The following table 1 gives an overview about error cases in a WAN, examples for causes of such error, the mechanism of detecting the error fault, and the consequent action. The following table 2 summarizes the same information for errors occurring at the edge node, i.e. at a node at which a service terminates and which has direct physical connection to customer equipment via a user network interface. A "transit node" is a node without direct physical connection to the customer equipment subscribed to the end-to-end service. In the table, "CFM" refers to connectivity fault management, and "CPE" refers to customer premises equipment.

TABLE 1

| Error cases in WAN | Example | Error detected in | Error Fault Detection Mechanism | Consequent action |
| --- | --- | --- | --- | --- |
| Physical link failure, bi-or unidirectional | Fibre cut | Edge Node | CFM | Link-down client IF on edge nodes by SLF mechanism |
| Logical e2e path error or ethernet link error | Misconfiguration | Edge Node | CFM | Link-down client IF on edge nodes by SLF mechanism |
| Transit node equipment failure, temporary | Power failure | Edge Node | CFM | Link-down client IF on edge nodes by SLF mechanism |
| Transit node equipment failure, permanent | Damaged equipment | Edge Node | CFM | Link-down client IF on edge nodes by SLF mechanism |

TABLE 2

| Error cases at the WAN edges nodes | Example | Error detected in | Error Fault Detection Mechanism | Consequent action |
|---|---|---|---|---|
| Physical link failure on client interfaces to router/CPE, bi-or unidirectional | Fibre cut | Router/CPE Edge Node | Link down detection Router/CPE and Edge Node | CFM error notification by SLF mechanism leads to Link-down client IF on remote edge node by SLF mechanism |
| Ethernet link error on client interfaces to router/CPE, bi-or unidirectional | Misconfiguration | Router/CPE Edge Node | Link down detection Router/CPE | CFM error notification by SLF mechanism leads to Link-down client IF on remote edge node by SLF mechanism |
| Edge node equipment failure, temporary | Power failure | Router/CPE | Link down detection Router/CPE, CFM | Missing CFM notification leads to Link-down client IF on remote edge node by SLF mechanism |
| Edge node equipment failure, permanent | Damaged equipment, | Router/CPE | Link down detection Router/CPE, CFM | Missing CFM notification leads to Link-down client IF on remote edge node by SLF mechanism |

Figure 14:
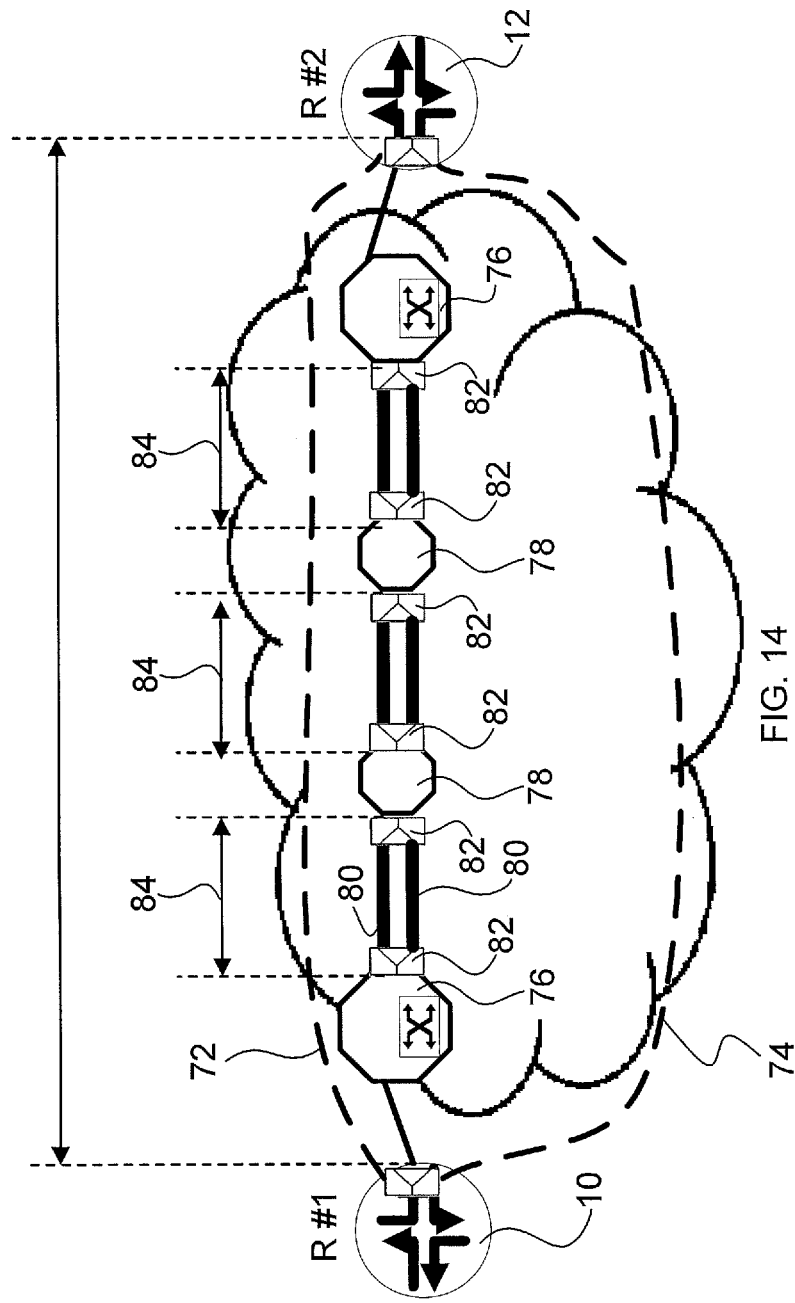
FIG. 14 shows an exemplary WAN in which optical protection on the optical physical layer and logical service path protection by SLF involving layers 2 and 3 are combined.

FIG. 14 again shows a first and a second router 10, 12, which are connected via two disjoint logical end-to-end services 72 and 74 represented by dashed lines. Further shown in FIG. 14 are components involved by the logical end-to-end service 72. The terminal nodes of the logical service 72 are formed by network elements 76 on which corresponding MEPs and databases for use in the SLF mechanism are established. The network elements 76 are have ethernet/packet aggregation capabilities for ethernet/packet services. Along the path connecting the terminal nodes 76, network elements 78 without ethernet/packet aggregation capabilities are shown. These network elements 78 are transparent for ethernet/packet services. Between the network elements 76, 78, optical connections 80 are shown, which are represented by thick lines. As is seen in FIG. 14, between each to network elements 76, 78, two disjoint optical connections are present, allowing for optical protection. Reference sign 82 optical protection switches.

The optical protection provides reliability on the optical physical layer, i.e. layer 0 between neighboring network elements. The corresponding reach of the optical protection is designated by reference sign 84. The optical protection for example increases robustness against fiber break scenarios. Due to the direct optical connection 80 between adjacent network elements 76, 78, the optical protection time can be faster than 1 ms.

The logical service path protection established by the routers 10, 12 and layer 2 switch mechanisms involving layers 2 and/or 3 with fast fault detection employing the SLF mechanism provides real end-to-end protection between routers 10 and 12, including protection from failure of complete network elements. Using the SLF mechanism, the logical service protection time can be faster than 50 ms.

Since the mechanisms of optical and logical service protection are covering different reach, working on different layers and operating on different protection times, both mechanisms can be ideally be combined. During the network planning, special care should be taken that the lower layer protection mechanism comes always with faster protection time than the higher layer protection.

A very important advantage of the SLF mechanism as described herein is that it allows not only for a robust, but also for a highly scalable service-based fault management. Namely, it is essentially the WAN network 16 itself that cares for the service fault management, leading to fast fault detection, rather than the external equipment. The more logical services are needed, the more "intelligence" is added to the WAN network 16 to handle end-to-end service aware fault management, for example by the information stored in the first and second databases 46 and 48 provided on the (increasing number of) nodes.

Figure 15:
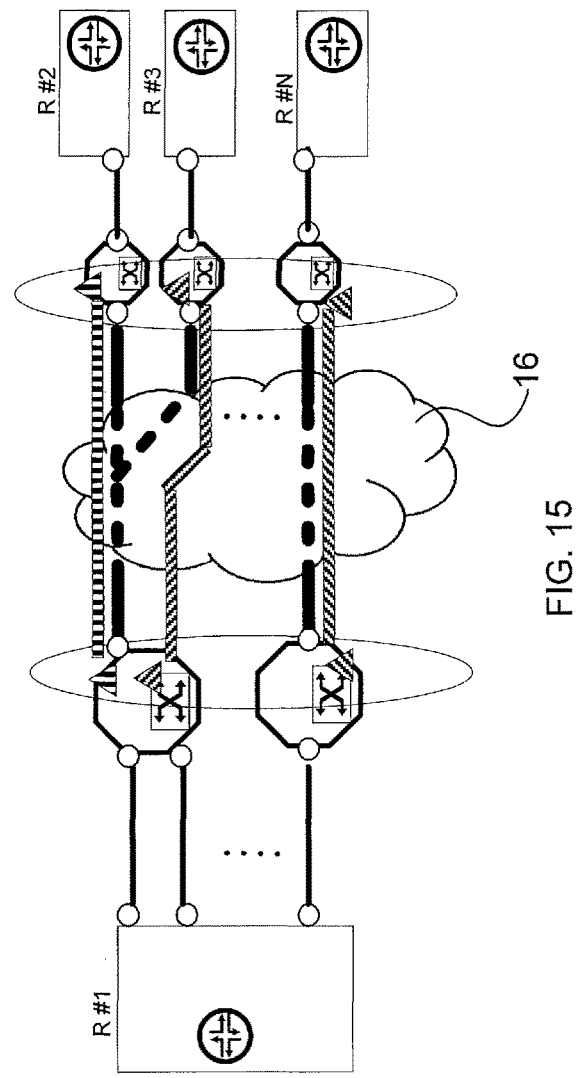
FIG. 15 illustrates the scalability of a WAN employing the SLF mechanism of the invention.

To further appreciate this aspect of the invention, reference is made to FIG. 15, showing the scalable network approach with the fault detection in the WAN employing the SLF mechanism as compared to an alternative scenario (FIG. 16), in which the fault detection would be carried out in the CPEs, such as in the routers. As is seen in FIG. 15, in the scenario of the invention employing the SLF mechanism, the service fault detection and processing is carried out in the network elements or communication nodes using the MEPs and the corresponding databases (not shown in FIG. 15) described above. Accordingly, if the network is growing, with increasing demand for services and bandwidth, additional communication nodes have to be added as well, which in turn take care of the service fault detection and processing under the SLF. Accordingly, this approach is inherently scalable. The "growth of the network" is symbolized by the dots in the left half of FIG. 15.

Moreover, since the WAN network 16 itself cares for the service fault management, the CPEs, such as the routers, do not need to have to provide specific capabilities for very fast service-based fault detection. This way, legacy routers, or even virtual routers implemented in software, may be sufficient. This is an enormous advantage in terms of capital expenditure.

Figure 16:
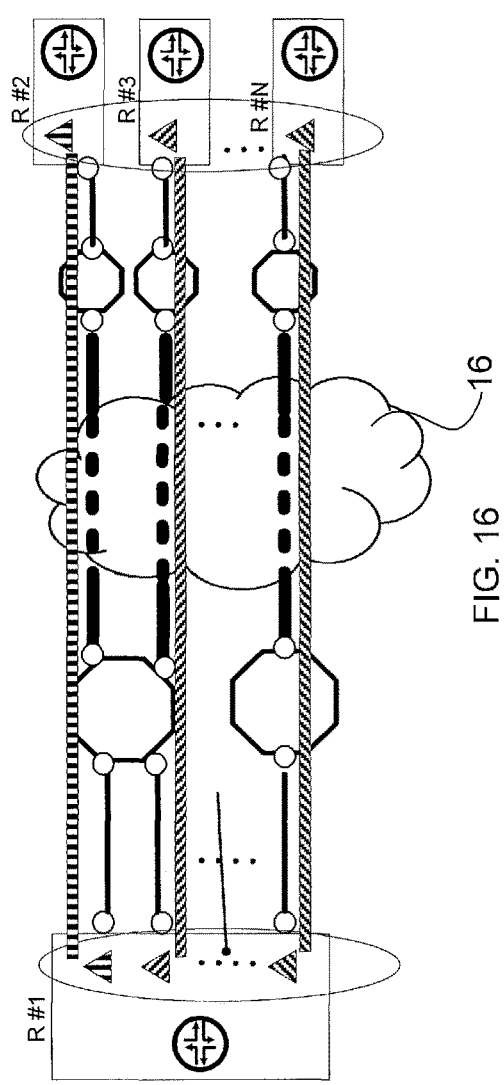
FIG. 16 illustrates the lack of scalability of an alternative scenario in which the fault detection would be carried out in the customer premises equipment.

In contrast to this, if the fast fault detection and processing capability was concentrated and performed on the routers, as shown in FIG. 16, then very complex and costly routers would be necessary to cover the network needs. Moreover, as the network grows, the demand on the performance of the routers would likewise increase, as indicated by the dots within router 10 of FIG. 16.

Accordingly, it is seen that the SLF mechanism of the invention has tremendous scalability and cost advantages.

Further advantages of the SLF mechanism are as follows:
1. With fault detection times as low as 20 ms, redundancy convergence times of below 50 ms become possible.

2. The SLF mechanism uses the service-based fault management database to control interface link states. The SLF mechanism further allows that network errors for specific services are only affecting specific interfaces and services. All other interfaces and services remain unaffected. This leads to a highly scalable and deterministic behavior, avoiding impact on not affected end-to-end services.
3. The SLF mechanism can be used in the context of both, network side errors and client side errors.
4. Since link states are used for signaling of network problems to the external equipment, multivendor interworking is possible with several layer 2 and layer 3 resiliency mechanisms. In fact, as was shown in the specific embodiments, very simple link down mechanisms can be used to inform CPEs about service faults, which means that very simple routers or even legacy routers can be used while still achieving fast redundancy convergence.
5. For resiliency and protection, activities outside of the WAN are initiated, triggered by the link state. This avoids additional performance requirements, for example for an automatic protection switching protocol, on carrier ethernet switch capabilities inside the WAN network.
6. Essentially, the SLF mechanism allows for providing an interface behavior, at the transfer network edge to router interfaces, in a way that is in many senses equivalent to direct physical connection to a partner router.

The invention claimed is:

1. A network node system, comprising:
a local network node comprising a local client interface configured to communicatively connect the local network node with a first client device, the local client interface being among a plurality of client interfaces that the local network node comprises, and
at least one database configured to store and permit retrieval of data to support operation of the network node system,
wherein at least a portion of the data relates to an association between the local client interface and an end-to-end service between the first client device and a second client device communicatively connected to a remote network node, the end-to-end service being among a plurality of services that the local network node is configured to enable,
wherein the network node system is configured to establish on the local network node a Maintenance End Point (MEP) associated with the end-to-end service configured to exchange connectivity messages with a corresponding MEP established on the remote network node,
wherein the network node system is configured to detect:
a client interface fault corresponding to a situation in which a communication between the local network node and the first client device becomes inoperative, and
a service fault corresponding to a situation in which a communication between the second client device and the local network node in relation to the end-to-end service become inoperative, the service fault based on at least one of:
a content of at least one connectivity message received from the corresponding MEP established on the remote network node,
at least one missing connectivity message from the corresponding MEP established on the remote network node, wherein the network node system is further configured to, in an event of a detection of the client interface fault:
identify, using the at least one database, the end-to-end service as a service, from among the plurality of services, with respect to which there is the association with the local client interface,
determine whether the identified end-to-end service is, according to the at least one database, subject to the service fault,
if the determine step indicates that the identified end-to-end service is, according to the at least one database, not subject to the service fault, then:
update the at least one database to indicate that the local client interface is subject to the detected client interface fault, and
transmit information to the corresponding MEP established on the remote network node in response to the detected client interface fault, and
thereafter further update the at least one database, once a recovery from the detected client interface fault is detected, to instead indicate that the local client interface is not subject to the detected client interface fault,
if the determine step instead indicates that the identified end-to-end service is, according to the at least one database, subject to the service fault, then refrain from updating the at least one database to indicate that the local client interface is subject to the detected client interface fault,
wherein the network node system is further configured to, in an event of a detection of the service fault:
identify, using the at least one database, the local client interface as a client interface, from among the plurality of client interfaces, with respect to which there is the association with the end-to-end service, and
in response to the identification of the local client interface as the client interface with respect to which there is the association with the end-to-end service, carry out a predetermined action associated with the local client interface.

2. The network node system of claim 1, wherein the network node system is further configured to, in an event of a detection of a recovery from the service fault, revert the predetermined action.

3. The network node system of claim 1, wherein the at least one database includes information that enables a determination of at least one of:
whether another service, among the plurality of services, is subject to a service fault corresponding to the another service,
whether a client interface associated with the remote network node is subject to a remote network node client interface fault,
whether another client interface, among the plurality of client interfaces, is subject to a client interface fault corresponding to the another client interface.

4. The network node system according to claim 1, wherein the network node system is further configured to, in response to at least one of:
at least one connectivity message received by the local network node,
receipt by the local network node of the at least one connectivity message,
at least one missing connectivity message,
carry out at least one of the following steps:
update the at least one database to indicate that the service fault has occurred, update the at least one database to indicate that a fault with the remote client device has occurred,
update the at least one database to indicate a recovery from the fault with the remote chant device.

5. The network node system according to claim 1, wherein at least one of the connectivity messages is, at least in part, based on information stored in the at least one database that indicates whether the local client interface is subject to the detected client interface fault.

6. The network node system of claim 1, wherein the at least one database stores at least one of:
the predetermined action,
information that at least in part enables execution of the predetermined action.

7. The network node system of claim 1, wherein the predetermined action comprises a step of informing the first client device of the service fault.

8. The network node system of claim 7, wherein the predetermined action further comprises at least one of the following steps:
closing down a link between the local network node and the first client device,
dropping of at least one frame supplied from the client interface,
modifying at least one frame supplied from the client interface, and
re-directing at least one frame supplied from the client interface.

9. The network node system of claim 1, wherein the local network node is configured to enable a protocol for connectivity fault management.

10. The network node system of one of claim 1, wherein the connectivity messages comprise a plurality of connectivity messages that the remote network node is configured to transmit to the MEP at the local network node to indicate a status of the end-to-end service, and wherein with respect to the plurality of connectivity messages that the remote network node is configured to transmit, the remote network node is further configured to sequentially transmit at least certain individual ones of the plurality of the connectivity messages separated by a regular interval of time between successive transmissions.

11. The network node system of claim 1, wherein at least one of the connectivity messages comprises information that indicates a status of the local client interface.

12. The network node system of claim 1, wherein the network node system is configured to enable an operator to manually manipulate the at least a portion of the data to at least one of:
indicate whether a given service, among the plurality of services, is subject to a service fault corresponding to the given service,
indicate whether a given client interface, among the plurality of client interfaces, is subject to a client interface fault corresponding to the given client interface,
establish the association between the local client interface and the end-to-end service,
establish, for each given client interface among the plurality of client interfaces, an association between the each given client interface and at least one of the plurality of services,
set the predetermined action.

13. A network, comprising:
a first network node comprising a first client interface configured to communicatively connect the first network node with a first client device, the first client interface being among a plurality of client interfaces that the first network node comprises,
a second network node comprising a second client interface configured to communicatively connect the second network node with a second client device, and
at least one database configured to store and permit retrieval of data to support operation of the network,
wherein at least a portion of the data relates to an association between the first client interface and an end-to-end service between the first client device and the second client device, the end-to-end service being among a plurality of services that at least the first network node is configured to enable,
wherein the network is configured to establish on the first network node a first Maintenance End Point (MEP) associated with the end-to-end service,
wherein the network is configured to establish on the second network node a second Maintenance End Point (MEP) associated with the end-to-end service,
wherein the network is configured so that each of the first MEP and the second MEP transmits at least one connectivity message to the other of the first MEP and the second MEP,
wherein the network is configured to detect:
a client interface fault corresponding to a situation in which a communication between the first network node and the first client device becomes inoperative, and
a service fault corresponding to a situation in which a communication between the first network node and the second client device in relation to the end-to-end service becomes inoperative, the service fault based on at least one of:
a content of at least one connectivity message received from the second MEP,
at least one missing connectivity message from the second MEP,
wherein the network is further configured to, in response to detecting the client interface fault;
identify, using the at least one database, the end-to-end service as a service, from among the plurality of services, with respect to which there is the association with the first client interface,
determine whether the identified end-to-end service is, according to the at least one database, subject to the service fault,
if the determine step indicates that the identified end-to-end service is, according to the at least one database, not subject to the service fault, then:
update the at least one database to indicate that the first client interface is subject to the detected client interface fault, and
transmit information to the second MEP in response to the detected client interface fault, and
thereafter further update the at least one database, once a recovery from the detected client interface fault is detected, to instead indicate that the first client interface is not subject to the detected client interface fault,
if the determine step instead indicates that the identified end-to-end service is, according to the at least one database, subject to the service fault, then refrain from updating the at least one database to indicate that the first client interface is subject to the detected client interface fault, wherein the network is further configured to, in response to detecting the service fault:
identify, using the at least one database, the first client interface as a client interface, from among the first plurality of client interfaces, with respect to which there is the association with the end-to-end service, and
in response to the identification of the first client interface as the client interface with respect to which there is the association with the end-to-end service, carry out a predetermined action associated with the first client interface.

14. The network according to claim 13, wherein at least one of the first client device and the second client device is a least one of a router, a carrier ethernet switch, a provider backbone bridge, a packet relay device, a frame relay device, a Multiprotocol Label Switching (MPLS) label switch, an Asynchronous Transfer Mode (ATM) switch, or a lambda switch.

15. The network according to claim 13, wherein both the first client interface and at least another client interface, among the plurality of client interfaces, subscribe to the end-to-end service.

16. The network according to claim 13, wherein on at least the first network node, traffic on at least one client interface among the plurality of client interfaces is multiplexed to both the end-to-end service and at least another service among the plurality of services.

17. A method for loss forwarding in a network, the network comprising a first network node, a second network node, and at least one database configured to store and permit retrieval of data to support operation of the network, wherein an end-to-end service is established between a first client device, communicatively connected through a first client interface of the first network node among a plurality of first network node client interfaces, and a second client device, communicatively connected through a second client interface of the second network node, the end-to-end service being among a plurality of services that at least the first network node is configured to enable,
wherein a first Maintenance End Point (MEP) corresponding to the end-to-end service is established on the first network node and a second MEP corresponding to the end-to-end service is established on the second network node, the first MEP and the second MEP each being configured to exchange connectivity messages with the other of the first MEP and the second MEP,
said method comprising the following steps:
monitoring for an occurrence of a client interface fault corresponding to a situation in which a communication between the first network node and the first client device becomes inoperative,
in response to detecting the client interface fault, identifying, using information retrieved from the at least one database, the end-to-end service as a service, from among the plurality of services, with respect to which there is stored in the at least one database an association between the first client interface and the end-to-end service,
determining whether the identified end-to-end service is, according to the at least one database, subject to a service fault,
if the determining step indicates that the identified end-to-end service is, according to the at least one database, not subject to the service fault, then:
updating the at least one database to indicate that the first client interface is subject to the detected client interface fault, and
transmitting information to the second MEP in response to the detected client interface fault, and
thereafter further update the at least one database, once a recovery from the detected client interface fault is detected, to instead indicate that the first client interface is not subject to the detected client interface fault,
if the determining step instead indicates that the identified end-to-end service is, according to the at least one database, subject to the service fault, then refrain from updating the at least one database to indicate that the first client interface is subject to the detected dent interface fault,
monitoring for an occurrence of the service fault corresponding to a situation in which a communication between the first network node and the second client device in relation to the end-to-end service becomes inoperative, wherein the monitoring for the occurrence of the service fault is based on at least one of:
a content of at least one connectivity message received from the second MEP,
at least one missing connectivity message from the second MEP,
in response to detecting the occurrence of the service fault,
identifying, using the at least one database, the first client interface as a client interface, from among the plurality of first network node client interfaces, with respect to which there is the association with the end-to-end service, and
in response to the identification of the first client interface as the client interface with respect to which there is the association with the end-to-end service, carrying out a predetermined action associated with the first client interface.

18. The method of claim 17, further comprising the steps of monitoring for a recovery from the service fault, and
in response to detecting the recovery, reverting the predetermined action.

19. The method of claim 17, wherein the at least one database includes information that enables a determination of at least one of:
whether another service, among the plurality of services, is subject to a service fault corresponding to the another service,
whether a client interface associated with the second network node is subject to a second network node client interface fault,
whether another client interface, among the plurality of client interfaces, is subject to a client interface fault corresponding to the another client interface.

20. The method according to claim 17, further comprising a step of updating the at least one database in response to at least one of:
at least one connectivity message received by the first network node,
receipt by the first network node of the at least one connectivity message,
at least one missing connectivity message,
wherein the step of updating the at least one database comprises at least one of the following steps:
updating the at least one database to indicate that the service fault has occurred, updating the at least one database to indicate that a fault with the second client device has occurred, updating the at least one database to indicate a recovery from the fault with the second client device.

21. The method according to claim 17, wherein at least one of the connectivity messages is, at least in part, based on information stored in the at least one database that indicates whether the first client interface is subject to the detected client interface fault.

22. The method of claim 17, wherein the at least one database stores at least one of:

the predetermined action, information that at least in part enables execution of the predetermined action.

23. The method of claim 17, wherein the predetermined action comprises a step of informing the first client device of the service fault.

24. The method of claim 23, wherein the predetermined action further comprises at least one of the following steps:

closing down a link between the first network node and the first client device, dropping of at least one frame supplied from the client interface, modifying at least one frame supplied from the client interface, and re-directing at least one frame supplied from the client interface.

25. The method according to claim 17, wherein the connectivity messages comprise at least a plurality of connectivity messages that the second network node is configured to transmit to the first MEP to indicate a status of the end-to-end service, and wherein with respect to the plurality of the connectivity messages that the second network node is configured to transmit, the second network node is further configured to sequentially transmit at least certain individual ones of the plurality of the connectivity messages separated by a regular interval of time between successive transmissions.

26. The method of claim 17, wherein the connectivity messages comprise at least a plurality of connectivity messages that the first MEP is configured to transmit to the second MEP, and wherein the method further comprises the following steps:

if the at least one database is determined to indicate that the identified end-to-end service is at least one of operative and not subject to the service fault, then the first MEP undertakes to at least one of:

stop sending the connectivity messages to the second MEP, send the connectivity messages comprising content indicative of the detected client interface fault, in response to detecting a recovery from the detected client interface fault, the first MEP undertakes to at least one of:

start sending the connectivity messages to the second MEP, send the connectivity messages comprising content indicative of the recovery.

* * * * *